Figure 1:
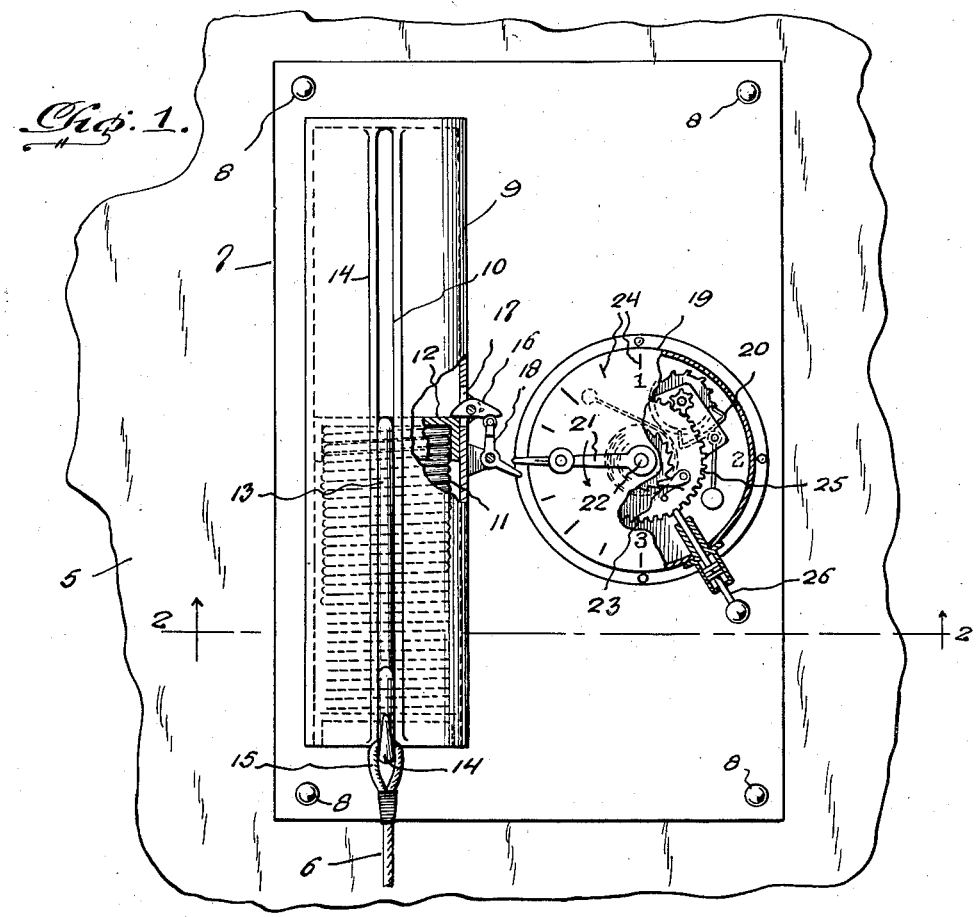

July 11, 1944.  P. K. BRESEE  2,353,440

AUTOMATIC PARACHUTE OPENING DEVICE

Filed Jan. 12, 1942

Inventor

Paul K. Bresee,

By J. Stanley Burch

Attorney

Patented July 11, 1944

2,353,440

UNITED STATES PATENT OFFICE 2,353,440

AUTOMATIC PARACHUTE OPENING DEVICE

Paul K. Bresee, Champaign, Ill.

Application January 12, 1942, Serial No. 426,521

3 Claims. (Cl. 244—150)

This invention relates to a device for automatically opening a folded parachute or parachute pack.

The primary object of the present invention is to provide a device of the above kind by means of which reliance upon the skill or ability of the parachute jumper to release and open the parachute pack at the proper time, is eliminated.

A more specific object is to provide a device of the above kind which may be readily set to release or open the parachute pack at the end of any desired period of time after the parachute jump has been made, whereby the parachute pack will be opened at the desired distance from the ground when the height of the parachute jump and the rate of fall per second is known.

Still another object of the present invention is to provide a device of the above kind which is extremely simple and durable in construction, efficient in operation, and economical to manufacture.

With the above and other objects in view, the present invention consists in the novel form, combination and arrangement of parts hereinafter more fully described, shown in the accompanying drawing and claimed.

Figure 2:
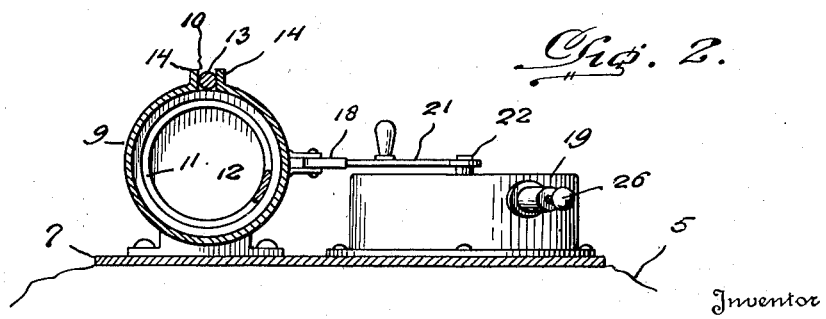

In the drawing:

Figure 1 is a fragmentary plan view, partly broken away and in section, showing a parachute releasing or opening device constructed in accordance with the present invention and operatively associated with a parachute pack; and Figure 2 is a section on line 2—2 of Figure 1.

Referring in detail to the drawing, 5 indicates a fragment of an ordinary parachute pack or folded parachute which may have the usual or any desired form of means for locking the same in folded condition, which locking means is releasable by pulling upon a rip cord 6, as is well known in the art.

The present invention relates to a mechanism for automatically operating the rip cord 6 so as to release and permit unfolding of the parachute pack at the desired time after a parachute jump has been made. This device includes a base member or plate 7 riveted or otherwise secured as at 8 to a suitable portion of the parachute pack. Fixed to the base member or plate 7 is a cylinder 9 whose ends are closed and which is provided in one side with a longitudinal elongated slot 10. Housed within the cylinder 9 is a helical compression spring 11, one end of which abuts an end of the cylinder 9 and the other end of which is engaged with a piston or plunger 12 slidably fitted in the cylinder 9. Rigid with and projecting laterally from the plunger 12 is one end portion of a rod 13 that extends longitudinally of the cylinder 9 and is slidably disposed between guide flanges 14 provided along opposite sides of the slot 10. The rod 13 projects toward the end of cylinder 9 engaged by one end of spring 11 where it terminates in a hook 14 engageable in a loop 15 provided on the free end of the rip cord 6. By disposing the rod 13 between the flanges 14, the plunger 12 is held in proper position within the cylinder 9 so as to not bind against the walls of the latter and to thereby insure free movement of the plunger in the cylinder at all times. Also, the hook 14 is directed away from the cylinder 9 so as to not be in the path of the flanges 14 and thereby interfere with the movement of the plunger 12 and the rod 13 under the influence of the spring 11.

Means is provided for locking the plunger 12 in retracted position with the spring 11 under compression as shown in Figure 1. This means includes a pivoted detent 16 projecting through a slot 17 in one side of the cylinder 9 and arranged to engage and hold the plunger 12 retracted when set as shown in Figure 1 and held in this set position. A locking lever 18 is provided to engage under the outer end of detent 16 and hold the latter in said locked position, until said lever 18 is released from the detent 16.

Timing mechanism is provided for releasing the locking lever 18 at any desired period of time after the parachute jump is made, and such timing mechanism is generally indicated at 19. This timing mechanism may consist of a suitable casing housing a spring motor having suitable escapement mechanism 20 and driving a minute hand 21 operatively connected with the drive shaft 22 of the spring motor through ratchet mechanism 23. The face of casing 19 constitutes a dial and is graduated in minutes and fractions thereof as at 24, the spring motor being adapted to drive the hand 21 in a counter-clockwise direction. Also, the hand 21 is freely movable relative to the motor shaft 22 in a clockwise direction by reason of the ratchet mechanism 23, whereby said hand 21 may be set at any desired point on the dial relative to the lever 18. In this way, the hand 21 can be set so that any desired period of time, within the range of the dial, may be caused to elapse before the hand 21 reaches and operates the lever 18 so as to release it from the detent 16 and permit the spring 11 to expand and operate plunger 12 and rod 13 for pulling rip cord 6 and causing opening of the parachute pack. A gear 25 is carried by the power shaft 22 of the spring motor and is engageable by a slidable locking pin 26 so that the timing mechanism may be prevented from operating until its use is required. By simply withdrawing the locking pin 26 from engagement with the teeth of gear 25, the timing mechanism may be released and permitted to operate. This will be done immediately prior to making parachute jumps.

In operation, the device will be set by arrangement of the parts as shown in Figure 1, after which the hand 21 will be swung or rotated clockwise to the desired point on the dial of timing device 19. Assuming that the hand 21 is set at the number 2 on the dial, it will require a lapse of two minutes before the hand rotates in a counterclockwise direction under the influence of the spring motor of said timing device and reaches the locking lever 18 so as to swing and disengage it from the detent 16. When the latter occurs, said detent will freely swing out of the path of plunger 12 and the spring 11 will expand in order to actuate plunger 12 and rod 13 for exerting a pull upon the rip cord 6 to thereby release and permit unfolding of the parachute pack. Of course, the locking pin 26 will have been released from gear 25 immediately prior to making the parachute jump.

A device of this kind may be used for landing troops quickly, as the timing can be set to release a jumper only a few hundred feet from the ground. Also, the device could be used for dropping supplies and the like, and a reasonably accurate landing can be effected. Many other advantages of the present invention will be apparent to those skilled in the art, and minor changes are contemplated in the specific detail construction illustrated and described.

What I claim as new is:

1. A device adapted automatically to open a packed parachute and comprising a base plate provided with means for attachment to the parachute pack, a hollow cylinder mounted on the outer face of the plate with the axis thereof in parallel relation with said plate, provided with end closures and having a substantially full length longitudinal slot and outwardly extending spaced apart flanges along its slot defining portions, a plunger mounted in the cylinder to slide back and forth between the central portion thereof and one end of the closures, a rod having one end extremity thereof bent at right angles, projecting through the slot and connected to the plunger, its remaining portion, with the exception of its other extremity, extending lengthwise of, and approximately half as long as, the cylinder, fitting slidably between the flanges and projecting from said one end extremity towards the other end closure, and its said other end extremity bent outwards and shaped to form means for attachment to the rip cord of the parachute, a compression spring in the cylinder extending between the plunger and said other end closure and arranged to urge said plunger toward said one end closure, releasable latch means mounted on the cylinder and adapted when in its operative or latched position to hold the plunger in the central portion of the cylinder against the force of the spring, and timing mechanism mounted on the base plate adjacent the cylinder and operative after a predetermined period of time to trip the latch means into its inoperative or unlatched position and thus release the plunger so that it is shiftable by the springs towards said one end closure and effect corresponding shift of the rod and parachute rip cord.

2. A device adapted automatically to open a packed parachute and comprising a base plate provided with means for attachment to the parachute pack, a hollow cylinder mounted on the outer face of the plate with the axis thereof in parallel relation with said plate, provided with end closures and having a substantially full length longitudinal slot and integral outwardly extending spaced apart flanges along its slot defining portions, a plunger mounted in the cylinder to slide back and forth between the central portion thereof and one of the end closures, a rod having one end extremity thereof bent at right angles, projecting through the slot and connected to the plunger, its remaining portion, with the exception of its other extremity, extending lengthwise of, and approximately half as long as, the cylinder, fitting slidably between the flanges and projecting from said one end extremity towards the other end closure, and its said other end extremity shaped to form an outwardly extending hook for detachable connection to the rip cord of the parachute, a compression spring in the cylinder extending between the plunger and said other end closure and arranged to urge said plunger toward said one end closure, releasable latch means mounted on the cylinder and adapted when in its operative or latched position to hold the plunger in the central portion of the cylinder against the force of the spring, and timing mechanism mounted on the base plate adjacent the cylinder and operative after a predetermined period of time to trip the latch means into its inoperative or unlatched position and thus release the plunger so that it is shifted by the spring towards said one end closure and effect corresponding shift of the rod and parachute rip cord.

3. A device adapted automatically to open a packed parachute and comprising a base plate provided with means for attachment to the parachute pack, a hollow cylinder mounted on the outer face of the plate with the axis thereof in parallel relation with said plate, provided with end closures and having a longitudinally extending slot, and in addition a substantially centrally positioned aperture, a plunger mounted in the cylinder to slide back and forth between the central portion thereof and one of the end closures, a rod extending transversely through the slot and having its inner end connected to the plunger and its outer end provided with means for attachment to the rip cord of the parachute, a compression spring in the cylinder extending between the plunger and the other end closure and arranged to urge said plunger toward said one end closure, releasable latch means operative to hold the plunger in the central portion of the cylinder against the force of the spring and consisting of a lever type detent mounted pivotally on the central portion of the cylinder and adapted when in its latch position to extend at right angles to the cylinder and have its inner end extend through the aperture and engage the plunger, and a bell crank type lever mounted pivotally on said central portion of the cylinder adjacent the detent and adapted when in its operative or latched position to have one arm thereof engage and extend at right angles to the other end of the detent and its other arm extend outwards, and timing mechanism mounted on the base plate adjacent the cylinder, operative after a predetermined period of time to trip the latch means into its inoperative or unlatched position and thus release the plunger so that it is shifted by the spring towards said one end closure and effect corresponding shift of the rod and parachute rip cord, and embodying a rotary element adapted to swing into engagement with said other arm of the bell crank type lever and to turn the lever so as to swing said one arm out of engagement with said other end of the detent.

PAUL K. BRESEE.